United States Patent

Hayashi

[15] 3,691,476

[45] Sept. 12, 1972

[54] DOUBLE HETEROSTRUCTURE LASER DIODES

[72] Inventor: Izuo Hayashi, Berkeley Heights, N.J.

[73] Assignee: Bell Telephone Laboratories, Incorporated, Murray Hill, Berkeley Heights, N.J.

[22] Filed: Dec. 31, 1970

[21] Appl. No.: 103,252

[52] U.S. Cl. ............................331/94.5, 317/234 R
[51] Int. Cl. ..................................................H01s 3/18
[58] Field of Search ..331/94.5; 317/235; 313/108 D; 250/217

[56] References Cited

OTHER PUBLICATIONS

Hayashi et al.: " Junction Lasers Which Operate Continuously at Room Temperature," Applied Physics Letters, vol. 17 pp. 109– 111, Aug. 1, 1970

*Primary Examiner*—Ronald L. Wibert
*Assistant Examiner*—Edward S. Bauer
*Attorney*—R. J. Guenther and Arthur J. Torsiglieri

[57] ABSTRACT

A double heterostructure laser diode, which includes a first narrow bandgap active region sandwiched between opposite conductivity type wider bandgap regions, is improved by the inclusion of a second narrow bandgap active region intermediate the first active region, with the bandgap of the second region being narrower than that of the first region. The first active region is preferably between about $\lambda/2$ and $\lambda$ in thickness and serves to provide optical confinement, whereas the second active region may approach an electron diameter in thickness and serves to provide carrier confinement.

16 Claims, 6 Drawing Figures

DOUBLE HETEROSTRUCTURE LASER DIODES

BACKGROUND OF THE INVENTION

This invention relates to semiconductor injection lasers and, more particularly, to modified double heterostructure injection lasers for use with active regions between $\lambda/2$ and $\lambda$ in thickness, where $\lambda$ is the wavelength of the recombination radiation as measured in the semiconductor.

In my copending application Ser. No. 33,705 (Case 4) filed on May 1, 1970, there is described, among other things, a double heterostructure (DH) semiconductor laser diode comprising a narrow bandgap active region sandwiched between a pair of opposite conductivity type wider bandgap regions thereby forming a pair of heteroboundaries, one at each interface with the narrow bandgap region. A p-n junction is located at or between the heteroboundaries. The difference in bandgap at each interface has two effects: it produces an electric field at each interface which serves to confine injected carriers to the active region, and it produces a discontinuity in index of refraction at each interface which serves to confine photons to the active region. In the active region, therefore, both carrier concentration (and hence gain) as well as the coupling between the confined carriers and photons are enhanced resulting in lower thresholds and a lower temperature dependence of the threshold. As reported by M. B. Panish, P. W. Foy, S. Sumski and myself in *Applied Physics Letters*, 17, 109 (Aug. 1970), this type of DH laser diode has been successfully operated on a c.w. basis at room temperature. The diode was fabricated from GaAs-AlGaAs by a liquid phase epitaxial technique described in copending application Ser. No. 28,365 (Panish-Sumski Case 5—5) filed on Apr. 14, 1970.

As discussed in my aforementioned copending application (Case 4), the upper bound on thickness of the narrow bandgap active region is preferably less than one micron in order that high carrier concentrations and hence low thresholds be obtained. From the standpoint of obtaining high carrier concentrations, therefore, it would be desirable to use active regions as thin as possible, thereby producing high gain and low thresholds. In practice, however, other considerations dictate that a lower bound on the thickness of the active region occurs at approximately one half the wavelength ($\lambda/2$) of the stimulated recombination radiation as measured in the semiconductor (about 0.125 $\mu$m for GaAs). Below approximately $\lambda/2$ several competing mechanisms take place: the tails of the optical field, which extend outside the active region into a lossy region, increase in size resulting in increased optical loss (absorption), reduced coupling between confined carriers and photons, and hence lower gain; simultaneously, the thinness of active region increases carrier concentration and hence increases gain. Analysis indicates, however, that the net effect of these competing mechanisms is higher thresholds or at best no net advantage of active regions less than about $\lambda/2$ in thickness.

It is therefore one object of my invention to achieve reduced room temperature thresholds in semiconductor lasers.

It is another object of my invention to achieve further reduced room temperature thresholds in DH lasers having a pair of overlapping active regions, one for optical confinement and the other for carrier confinement.

SUMMARY OF THE INVENTION

These and other objects are accomplished in accordance with an illustrative embodiment of my invention, an improved DH laser including a first narrow bandgap active region and a second narrow bandgap active region intermediate the first region, with the bandgap of the second region being narrower than that of the first region. The first active region is between about $\lambda/2$ and $\lambda$ in thickness and serves to provide optical confinement, whereas the second active region, which may approach an electron diameter in thickness, serves to provide carrier confinement. It should be noted that the designation of the first region as an "active" region deviates somewhat from conventional usage in the prior art which considers the active region as that region in which recombination of holes and electrons takes place. In the improved DH, recombination takes place in the second active region which, however, is included within, but is thinner than, the first active region.

Analysis of this structure indicates that as the thickness ($d_2$) of the second region decreases, the following changes take place: the optical losses remain approximately constant since the thickness ($d_1$) of the first region is fixed; carrier concentration ($n$) increases approximately linearly; optical coupling ($\Gamma$) decreases approximately linearly; and gain, which is approximately proportional to $n^2\Gamma$, increases approximately linearly with decreasing $d_2$. Consequently, it is expected that the improved DH laser will exhibit higher gain and lower thresholds than the earlier form of DH laser.

BRIEF DESCRIPTION OF THE DRAWING

These and other objects of the invention, together with its various features and advantages, can be more easily understood from the following more detailed description taken in conjunction with the accompanying drawing, in which:

FIG. 4 in Part A shows the layered structure of an improved DH laser in accordance with an illustrative embodiment of my invention and in Parts B, C, and D, further shows the illustrative bandgap profile, refractive index profile and light intensity distribution of such a laser, respectively.

DETAILED DESCRIPTION

Figure 1:
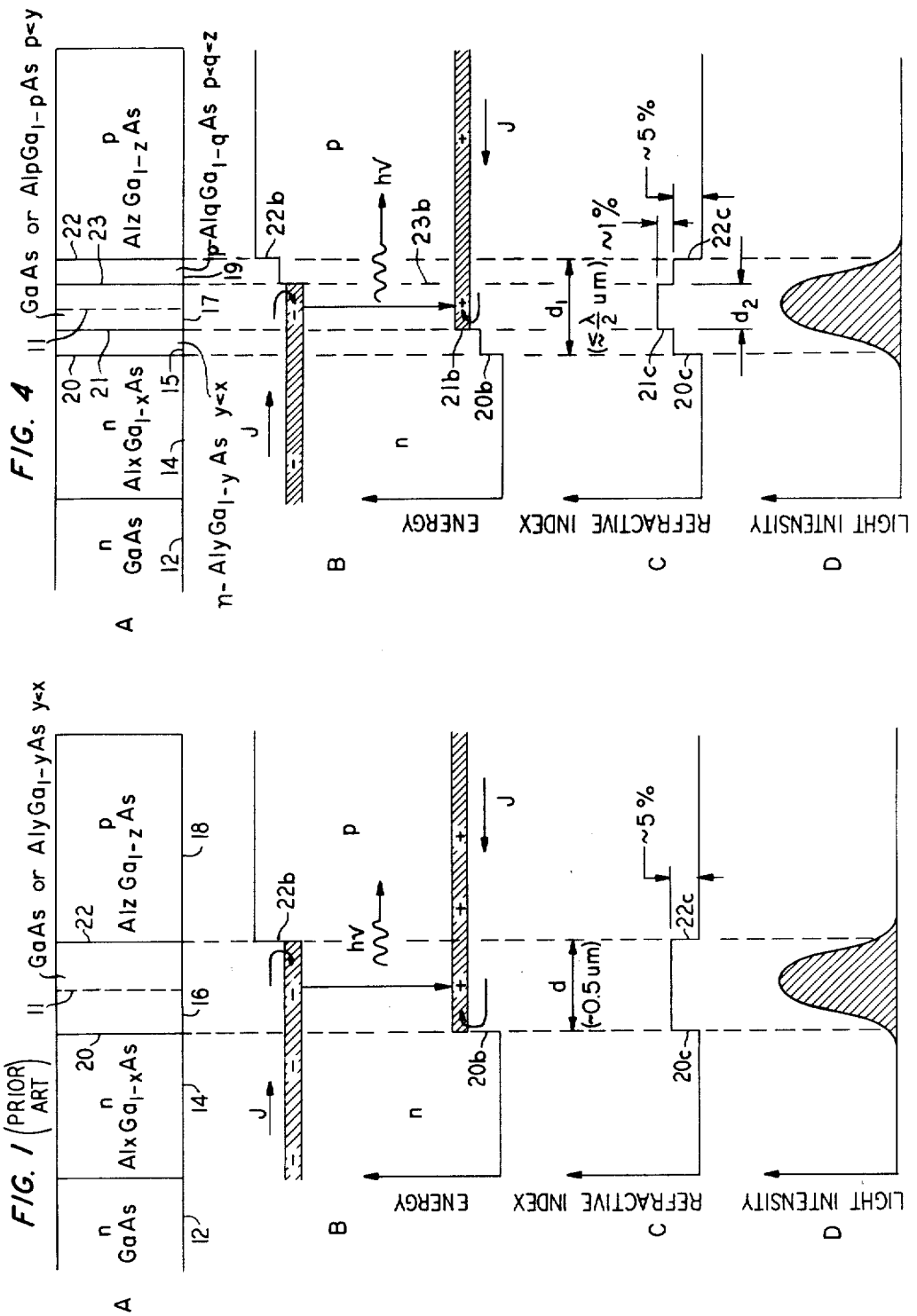
FIG. 1 shows the layered structure of a typical earlier form of DH laser in Part A and shows the illustrative bandgap profile, refractive index profile, and light intensity distribution of such a laser in Parts B, C, and D respectively.

Before discussing my invention in detail, a brief analysis of an earlier form of DH laser will be presented for the purposes of comparison. As shown schematically in FIG. 1, Part A, such a DH laser typically comprises an n-type gallium arsenide substrate 12 on which are grown by a liquid phase epitaxial technique three layers in the sequential order following: an n-type $Al_xGa_{1-x}As$ layer 14, a GaAs or $Al_yGa_{1-y}As$ layer 16 with $y < x$ and a p-type $Al_zGa_{1-z}As$ layer 18 with $y < z$. For simplicity the electrical contacts to the substrate 12 and layer 18 of the laser diode have been omitted. By controlling the aluminum concentration in layers 14, 16, and 18, the active layer 16 is made to have a narrower bandgap than either of layers 14 or 18, thereby forming a pair of heteroboundaries 20 and 22 at the interfaces between layers 14 and 16 and between layers 16 and 18 respectively. A p-n junction 11 is located between the heteroboundaries 20 and 22. It shall be assumed for all purposes hereinafter that the term "between" includes the case in which the p-n junction is coincident with either heteroboundary.

Associated with each heteroboundary is a discontinuity (or step) in the bandgap energy profile as shown at 20b and 22b in FIG. 1, Part B. The effect of this discontinuity is to create an electric field which reflects injected electrons at heteroboundary 22 and reflects injected holes at heteroboundary 20, thereby effectively confining injected carries to the active layer 16. These carriers produce a population inversion between the conduction and valence bands resulting in radiative recombination of holes and electrons and the emission of stimulated coherent radiation characteristic of the bandgap in the active layer 16.

Also associated with each heteroboundary is a discontinuity in index of refraction as shown at 20c and 22c in FIG. 1, Part C, which form an optical waveguide to confine the photons generated in the recombination process to the active region as shown by the light intensity distribution of FIG. 1, Part D.

Figure 2:
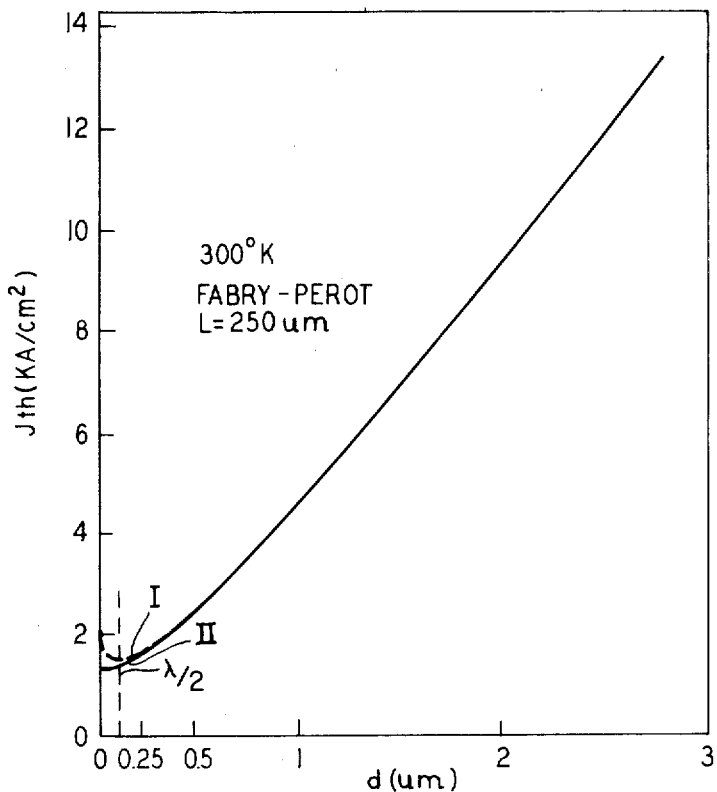
FIG. 2 is a graph of current threshold density as a function of active region thickness for the earlier form of DH laser.

As shown in FIG. 2, the current density threshold $J_{th}$ of the earlier form of DH laser decreases approximately linearly as a function of $d$, the thickness of the active layer 16 for $\lambda/2 \leq d \leq 3$ $\mu$m, where $\lambda$ is the wavelength of the stimulated radiation as measured in the active layer. As the thickness of the active layer, however, is decreased below $\lambda/2$, the threshold begins to increase (FIG. 2, curve I) or at best remains constant (FIG. 2 curve II) depending on how the active layer is doped and other parameters. A qualitative understanding of this phenomenon can be had from the following brief explanation. In the earlier form of DH laser, to a first approximation, the gain is proportional to the product $n^2\Gamma$ for a structure in which $d \leq \lambda/2$, where $n$ is the carrier concentration in the active layer and $\Gamma$ is the coupling between confined carriers and the optical field in the active layer. Since the coupling is approximately directly proportional to $d^2$ and since the carrier concentration is proportional to $d^{-1}$, the net effect of decreasing $d$ is to produce no net increase in gain. It should be noted that the exponents here were chosen for the purposes of simplicity and are not intended to reflect the actual exponents which can be empirically determined. Thus, in this form of DH laser it is difficult to take advantage of the increase in carrier concentration which results from thin active layers because reducing $d$ sacrifices optical coupling.

Figure 3A:
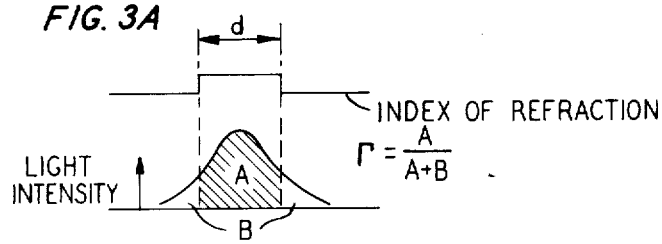
FIG. 3A shows a typical index of refraction profile and light intensity distribution in the earlier form of DH laser.
Figure 3B:
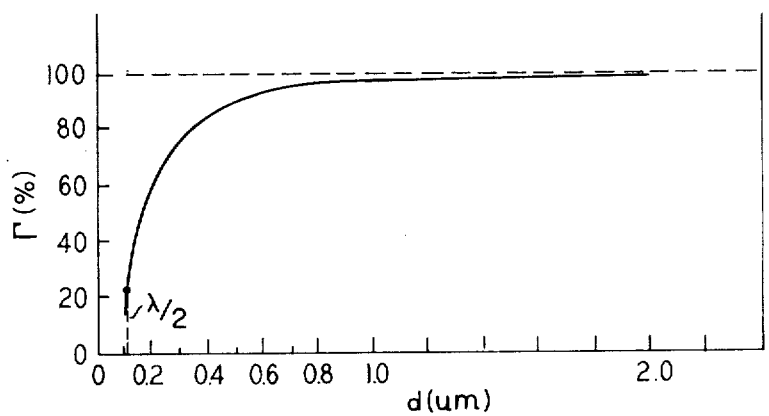
FIG. 3B is a graph of the fraction of light confined to the active region as a function of the thickness of the active region for such a DH laser.

A quantitative measure of the loss in coupling is depicted in FIG. 3A where the light intensity distribution is plotted along with the index of refraction profile for this DH laser structure. The optical coupling $\Gamma$ is defined as the fraction of light confined to the active layer as compared with the total amount of light generated. It can be seen from the graph of FIG. 3B ($\Gamma$ is a function of $d$) that as the thickness of the active layer is reduced, $\Gamma$ decrease rapidly until $\Gamma$ is only about 20 percent for $d \approx \lambda/2$. Consequently, 80 percent of the stimulated radiation is distributed in the tails of the optical field which extend outside the active layer. These tails do not undergo radiative recombination (i.e., are not coupled to the confined carriers) and furthermore increase optical absorption, since they extend into adjacent lossy layers.

In accordance with an illustrative embodiment of my invention, for DH structures in which the active layer is between approximately $\lambda/2$ and $\lambda$ in thickness, there is included a second active layer intermediate the usual active layer (hereinafter termed the first active layer) having a bandgap narrower than that of the first layer. The structure of my modified DH laser is shown in detail in FIG. 4, Part A in which identical numerals have been utilized for components corresponding to the earlier form of DH laser of FIG. 1, Part A. The improved DH laser illustratively comprises an n-type GaAs substrate 12 upon which are epitaxially grown the following layers in the sequential order recited: an n-type $Al_xGa_{1-x}As$ layer 14; an n-type $Al_yGa_{1-y}As$ layer 15 with $y < x$; a GaAs or $Al_pGa_{1-p}As$ layer 17 with $p < y$; a p-type $Al_qGa_{1-q}As$ layer 19 with $p < q$; and a p-type $Al_zGa_{1-z}As$ layer 18 with $q < z$. A first pair of heteroboundaries 20 and 22 are formed at the interfaces between layers 14 and 15 and layers 18 and 19, respectively, and a second pair of heteroboundaries 21 and 23 are formed at the interfaces between layers 15 and 17 and between layers 17 and 19 respectively. A p-n junction 11 is located between heteroboundaries 21 and 23. For simplicity the contacts to my improved DH laser have been once again omitted.

Associated with each heteroboundary 21 and 23 is an energy step in the bandgap profile as shown at 21b and 23b in FIG. 4, Part B. This step creates an electric field which serves to reflect electrons at heteroboundary 23 and to reflect holes at heteroboundary 21, thereby confining the injected carriers to the second active layer 17. Associated with each heteroboundary 20 and 22, on the other hand, is a discontinuity in the refractive index as shown at 20c and 22c in FIG. 4, Part C, which forms an optical waveguide to confine the optical radiation to the first active layer between heteroboundaries 20 and 22.

A qualitative analysis of the improved DH laser is as follows. Assuming that the thickness $d_1$ of the first active layer (the function of which is to produce optical confinement) is fixed, the optical losses remain approximately constant, but, as with the earlier form of DH laser, carrier concentration increases and optical coupling decreases as the thickness $d_2$ of the second active layer 17 is decreased. Although in both types of DH laser (1) gain is approximately proportional to $n^2\Gamma$ and (2) $n$ is proportional to $d_2^{-1}$, in the improved DH laser $\Gamma$ is proportional to $d_2$ and not $d^2$ as in the earlier form of DH laser. The net effect is that optical losses remain constant while gain increases approximately linearly with decreasing $d_2$, thereby resulting in lower thresholds than otherwise attainable. Once again, the exponents have been chosen as integers for simplicity only.

It should be noted that optical absorption losses can be further reduced if the second active layer 17, instead of being centrally located within the first active layer, is disposed nearer to heteroboundary 22. In such a structure advantage is taken of the fact that less optical absorption occurs in the n-type layer 15 than in the p-type layer 19.

In a preferred embodiment, the active regions are made symmetrical, i.e., energy steps 20b and 22b are equal (forming a symmetrical waveguide) as are energy steps 21b and 23b, or equivalently $y \approx q < x \approx z$. Furthermore, steps 20b and 22b are preferably greater than steps 21b and 23b, or equivalently $(y-p) < (x-y)$ and $(q-p) < (z-q)$, since fewer eV are required to confine electrons than photons.

By way of illustration, the index of refraction steps 20c and 22c at heteroboundaries 20 and 22 respectively are typically in the range of 5 to 10 percent (as compared to the index of refraction of pure GaAs) whereas the index of refraction steps 21c and 23c at heteroboundaries 21 and 23 respectively are about 1 to 2 percent. The corresponding bandgap steps 20b and 22b at heteroboundaries 20 and 22 respectively are about 300 to 500 meV, whereas the energy steps 21b and 23b at heteroboundaries 21 and 23 respectively are typically about 50 to 100 meV.

Figure 5:
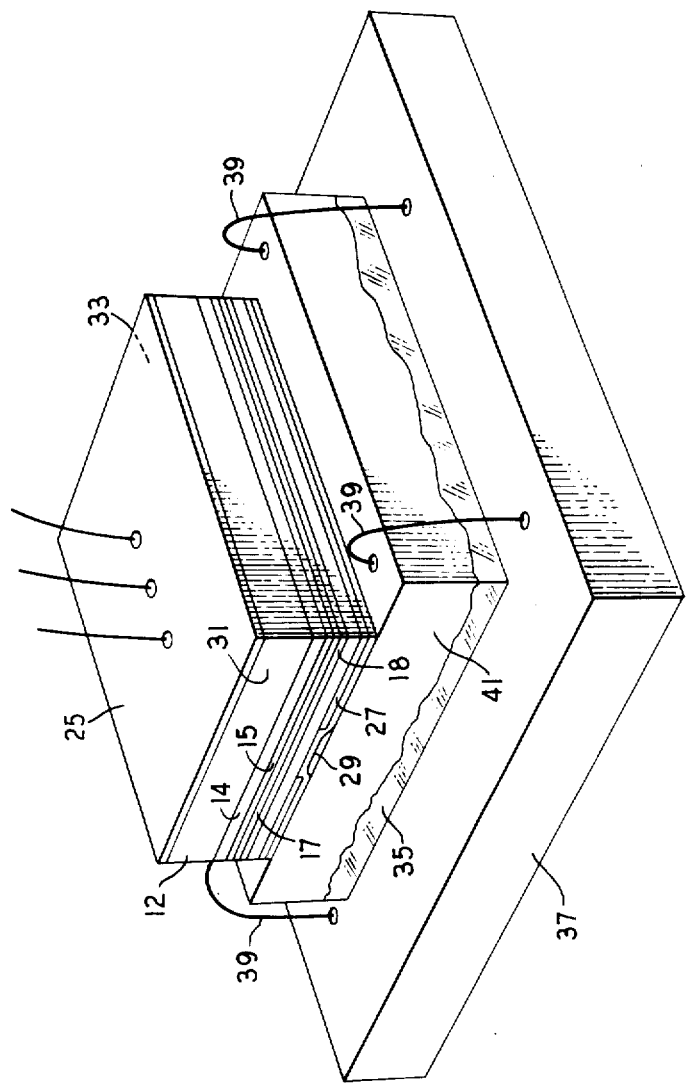
FIG. 5 is a schematic of the DH laser of FIG. 4, Part A mounted on a heat sink.

Turning now to FIG. 5, there is shown an illustrative embodiment of my invention in which the multi-layered improved DH laser of FIG. 4, Part A is mounted upon a heat sink for c.w. operation at room temperature. In the following description materials and dimensions are given for the purposes of illustration only and are not to be construed as limitations on the scope of the invention. As discussed previously, the improved DH laser comprises an n-type GaAs substrate 12 about 3-4 mils thick upon which are sequentially fabricated epitaxial layers in the following order: an $Al_xGa_{1-x}As$ layer 14 about 3µm thick, a first active layer between heteroboundaries 20 and 22 which is about 0.2 µm thick, a second active layer 17 which is typically about 0.1 to 0.03 µm thick, and a p-type $Al_x$-$Ga_{1-x}As$ layer 18 which is 1 µm in thickness. Typically region 15 is n-type whereas region 19 is p-type, but the second active layer 17 may be either p-type or n-type.

Before depositing a metallic contact 25 onto the n-type substrate 12, a p-type dopant (e.g., zinc) is typically diffused into p-type $Al_xGa_{1-x}As$ layer 18 to form a shallow (e.g., 0.2 µm) p$^+$ layer (not shown) to provide good ohmic contact. On p-type layer 18 is deposited an oxide layer 27 having an elongated channel etched therein by well-known photolithographic techniques to define a stripe electrical contact formed by the deposition of a metal layer 29 thereover.

End faces 31 and 33 of the structure are typically cleaved or polished optically flat and perpendicular to the p-n junction (not shown) to form an optical cavity resonator for sustaining coherent radiation generated in the junction. Illustratively, the diode is about 400 µm long and 80 µm wide. One of the end faces is made nearly totally reflective (e.g., face 33) whereas the other (face 31) is made partially transmissive in order to provide a means of egress for the coherent radiation.

The laser diode by means well known in the art (but not shown) is forward-biased and pumped by a dc source in excess of the lasing threshold. For c.w. operation at room temperature and above, contact 29 may be bonded to a metallized (e.g., thin-plated) high thermal conductivity diamond 35 mounted on a tin-plated copper heat sink 37. Due to the difficulty in getting the tin-plating to cover the entire diamond 35, gold wires 39 (about 25 µm in diameter) may be used to ground the tin-plated top surface 41 of the diamond to the heat sink 27. For low thresholds (e.g., 3,000 A/cm$^2$) the diamond may be omitted and the diode mounted directly on the copper heat sink. Furthermore, improved heat extraction may be obtained by mounting the diode between a pair of heat sinks.

In the fabrication of my improved DH laser it should be remembered that extremely thin layers are utilized, e.g., the thickness of the first active layer, which serves to provide optical confinement, may be about 0.1 to 0.2 µm whereas the thickness of the second active layer, which serves to confine carriers, may approach an electron diameter (about 100 A). It is therefore preferable to employ the molecular beam epitaxial growth technique described by J. R. Arthur, Jr., in copending application Ser. No. 787,470 now U.S. Pat. No. 3,615,731 (Case 3) filed on Dec. 27, 1968 and assigned to the assignee hereof. As described in the latter application, the molecular beam technique readily permits the growth of epitaxial layers of III–V compounds as thin as 100 to 200 A. That application further describes techniques for growing mixed crystals of III–V compounds such as AlGaAs as well as techniques for introducing into the epitaxial layers either p-type or n-type dopants. In this regard it may be advantageous in the growth of GaAs − AlGaAs improved DH lasers to utilize an amphoteric dopant such as germanium or silicon. In accordance with an invention of A. Y. Cho, to be the subject matter of a later filed application, germanium (or silicon) enters the substrate as a p-type impurity when the surface of the substrate is gallium rich, but enters the substrate as an n-type impurity when the surface of the substrate is arsenic rich. Whether or not the substrate is gallium or arsenic rich depends on the ratio of the arrival rates of As and Ga as well as the substrate temperature. In general, higher ratios and higher substrate temperatures produce a Ga rich surface and vice versa. For example, on the (100) surface of GaAs at 570° C. (or on $Al_xGa_{1-x}As$ with $x = 0.23$), germanium enters as an n-type dopant for a Ga arrival rate of 1 $\times$ 10$^{14}$/sec/cm$^2$ and an As arrival rate of 1 $\times$ 10$^{15}$/sec/cm$^2$. Under the same conditions, but for a Ga arrival rate of 3 $\times$ 10$^{14}$/sec/cm$^2$, germanium enters as a p-type dopant.

It is to be understood that the above-described arrangement are merely illustrative of the many possible specific embodiments which can be devised to represent application of the principles of the invention. Numerous and varied other arrangements can be devised in accordance with these principles by those skilled in the art without departing from the spirit and scope of the invention.

What is claimed is:

1. For use in a semiconductor injection laser, a semiconductor body comprising:
   first and second wide bandgap semiconductor regions of opposite conductivity types,
   a first narrow bandgap active region intermediate to and contiguous with said first and second regions,
   a second narrow bandgap active region intermediate said first active region, the bandgap of said second active region being smaller than the bandgap of said first active region,
   a p-n junction located within said second active region, carriers injected under forward bias across said junction being confined to said second active region where they undergo radiative recombination to generate stimulated coherent radiation, said radiation being confined substantially to said first active region,
   the thickness of said first active region being between approximately $\lambda/2$ and $\lambda$, where $\lambda$ is the wavelength of said radiation as measured in said semiconductor body.

2. The semiconductor body of claim 1 wherein said second active region is disposed nearer to the one of said wider bandgap regions which is p-type rather than the wider bandgap region which is n-type.

3. The semiconductor body of claim 1 wherein the difference in bandgap between said wide bandgap regions and said first active region is greater than that between said first and second active regions.

4. The semiconductor body of claim 1 wherein said first and second wide bandgap regions comprise respectively $Al_xGa_{1-x}As$ and $Al_zGa_{1-z}As$, said first active region comprises $Al_yGa_{1-y}As$, $y < x$ and $y < z$, and said second active region comprises $Al_pGa_{1-p}As$ where $0 \leq p < y$.

5. The semiconductor body of claim 4 wherein $x \approx z$, $(x-y) \approx (z-y)$, $(-y) > (y-p)$ and $(z-y) > (y-p)$.

6. The semiconductor body of claim 1 for c.w. at room temperature and above in combination with a heat sink thermally coupled to said body to extract heat from the region of said p-n junction.

7. For use in a semiconductor injection laser, a semiconductor body including
   first and second heteroboundaries defining a first active region therebetween for confining recombination radiation,
   third and fourth heteroboundaries disposed between said first and second heteroboundaries, thereby defining a second active region for confining carriers, the bandgap of said second active region being smaller than that of said first active region, and
   a p-n junction located between said third and fourth heteroboundaries.

8. The semiconductor body of claim 7 wherein said first and second heteroboundaries are separated by a distance between approximately $\lambda/2$ and $\lambda$, where $\lambda$ is the wavelength of said radiation as measured in said body.

9. The semiconductor body of claim 7 wherein the said first region comprises $Al_xGa_{1-x}As$, $x > 0$ and said second region comprises $Al_yGa_{1-y}As$, $0 \leq y < x$.

10. A semiconductor injection laser comprising a multilayered semiconductor body including the following contiguous epitaxial layers in the order recited:
    a first n-type wide bandgap layer,
    a second layer having a bandgap smaller than said first layer,
    a third layer having a bandgap smaller than said second layer,
    a fourth layer having a bandgap larger than said third layer,
    a fifth p-type layer having a bandgap larger than said fourth layer,
    said first and second layers and said fourth and fifth layers forming, respectively, first and second heteroboundaries at the interfaces therebetween,
    said second and third layers and said third and fourth layers forming, respectively, third and fourth heteroboundaries at the interfaces therebetween,
    a p-n junction located between said third and fourth heteroboundaries,
    means for forward biasing said junction and for applying thereto current in excess of the lasing threshold to generate stimulated coherent recombination radiation,
    means forming an optical cavity resonator for sustaining the radiation,
    means for providing egress of said radiation from said resonator,
    carriers injected across said junction under the influence of said forward biasing means being confined substantially by said third and fourth heteroboundaries, and radiation generated by recombination of said injected carriers being confined substantially by said first and second heteroboundaries.

11. The laser of claim 10 for c.w. operation at room temperature and above in combination with a heat sink thermally coupled to said fifth layer to extract heat generated in said junction.

12. The laser of claim 11 including at least one stripe metallic electrical contact to said fifth layer.

13. The laser of claim 10 wherein said first and second heteroboundaries are parallel and separated by a distance between approximately $\lambda/2$ and $\lambda$, where $\lambda$ is the wavelength of the recombination radiation as measured in said semiconductor body.

14. The laser of claim 10 wherein the bandgaps of said first and fifth layers are equal, the bandgaps of said second and fourth layers are equal, the difference in bandgap between said first and second layers is greater than that between said second and third layers, and the difference in bandgap between said fifth and fourth layers is greater than that between said fourth and third layers.

15. The laser of claim 10 wherein
    said first layer comprises $Al_xGa_{1-x}As$, $x > 0$
    said second layer comprises $Al_yGa_{1-y}As$, $0 < y < x$
    said third layer comprises $Al_pGa_{1-p}As$, $0 \leq p < y$
    said fourth layer comprises $Al_qGa_{1-q}As$, $0 < q, p < q$, and
    said fifth layer comprises $Al_zGa_{1-z}As$, $0 < z, q < z$.

16. The laser of claim 15 wherein $y \approx q < x \approx z$, $(y-p) < (x-y)$ and $(q-p) < (z-q)$.

* * * * *

Disclaimer 3,691,476.—*Izuo Hayashi*, Berkeley Heights, N.J. DOUBLE HETEROSTRUCTURE LASER DIODES. Patent dated Sept. 12, 1972. Disclaimer filed July 12, 1974, by the assignee, *Bell Telephone Laboratories, Incorporated.*

Hereby enters this disclaimer to claim 7 of said patent.

[*Official Gazette December 24, 1974.*]

Notice of Adverse Decision in Interference

In Interference No. 98,390, involving Patent No. 3,691,476, I. Hayashi, DOUBLE HETEROSTRUCTURE LASER DIODES, final judgment adverse to the patentee was rendered Dec. 6, 1974, as to claim 7.

[*Official Gazette May 6, 1975.*]

UNITED STATES PATENT OFFICE
CERTIFICATE OF CORRECTION

Patent No. 3,691,476  Dated September 12, 1972

Inventor(s) I. Hayashi

It is certified that error appears in the above-identified patent and that said Letters Patent are hereby corrected as shown below:

Column 3, line 10, change "$Al_y Ga/_{1-y} ^y As$" to --$Al_y Ga_{1-y} As$--;

line 31, change "carries" to --carriers--.

Column 6, line 10, change "thin-plated" to --tin-plated--;

line 32, change "3,615,731" to --3,615,931--.

Column 7, line 38, change "$(-y)$" to --$(x-y)$--.

Column 8, line 61, at the end of the line change

"$q < 2$" to --$q < z$--.

Signed and Sealed this

*thirteenth* Day of *January 1976*

[SEAL]

Attest:

RUTH C. MASON
*Attesting Officer*

C. MARSHALL DANN
*Commissioner of Patents and Trademarks*